G. W. FURBECK.
BUTTER PAT MAKING MACHINE.
APPLICATION FILED JULY 13, 1912.

1,073,896.

Patented Sept. 23, 1913.
2 SHEETS—SHEET 1.

Witnesses
Frank R. Glow
M. K. Preston

Inventor
G. W. Furbeck
By George H. Thorpe Atty.

G. W. FURBECK.
BUTTER PAT MAKING MACHINE.
APPLICATION FILED JULY 13, 1912.
1,073,896.
Patented Sept. 23, 1913.
2 SHEETS—SHEET 2.
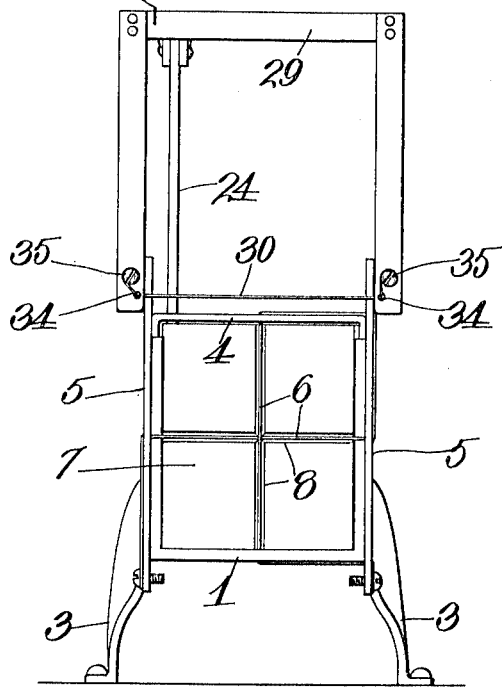
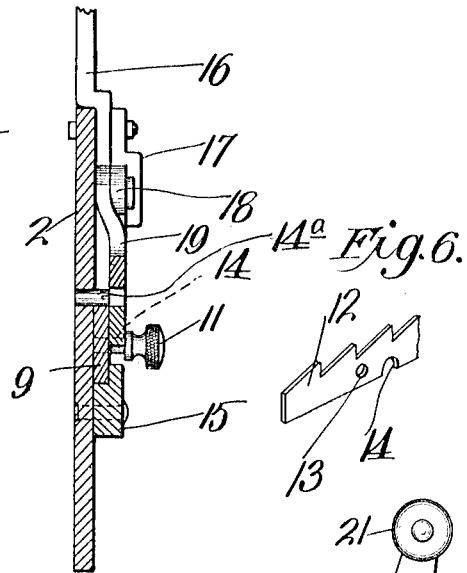
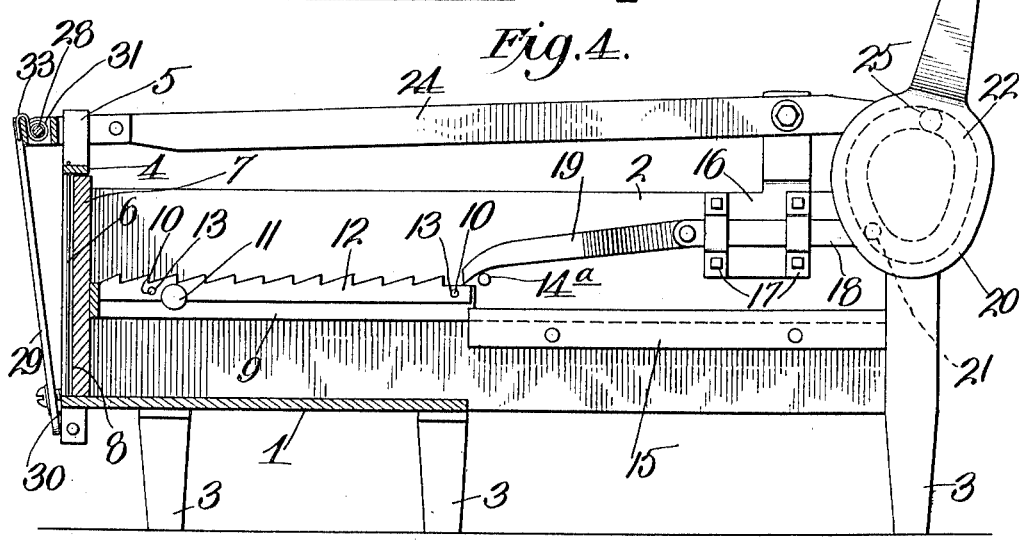
Witnesses
Frank R Glow
M. K. Preston
Inventor
G. W. Furbeck
By George Thorp Atty.

UNITED STATES PATENT OFFICE.

GEORGE W. FURBECK, OF KANSAS CITY, MISSOURI.

BUTTER-PAT-MAKING MACHINE.

1,073,896.  Specification of Letters Patent.  Patented Sept. 23, 1913.

Application filed July 13, 1912. Serial No. 709,198.

*To all whom it may concern:*

Be it known that I, GEORGE W. FURBECK, a citizen of the United States, residing at Kansas City, in the county of Jackson and State of Missouri, have invented certain new and useful Improvements in Butter-Pat-Making Machines, of which the following is a specification.

This invention relates to butter-pat making machines, and has for its object to produce a machine of this character by which a block of butter can be rapidly converted into rectangular "pats" of uniform size and by which the "pats" are separated from the block and each other as completed.

Another object is to produce a machine having a cam-wheel for alternately effecting the advance of the block of butter from which the "pats" are to be made and the operation of a slicer to complete the formation of and separate the "pats" from the block of butter.

A further object is to produce a machine of this character of simple, durable and cheap construction.

With these objects in view, the invention consists in certain novel and peculiar features of construction and organization, as hereinafter described and claimed; and in order that it may be clearly understood reference is to be had to the accompanying drawings, in which:—

Figure 1:
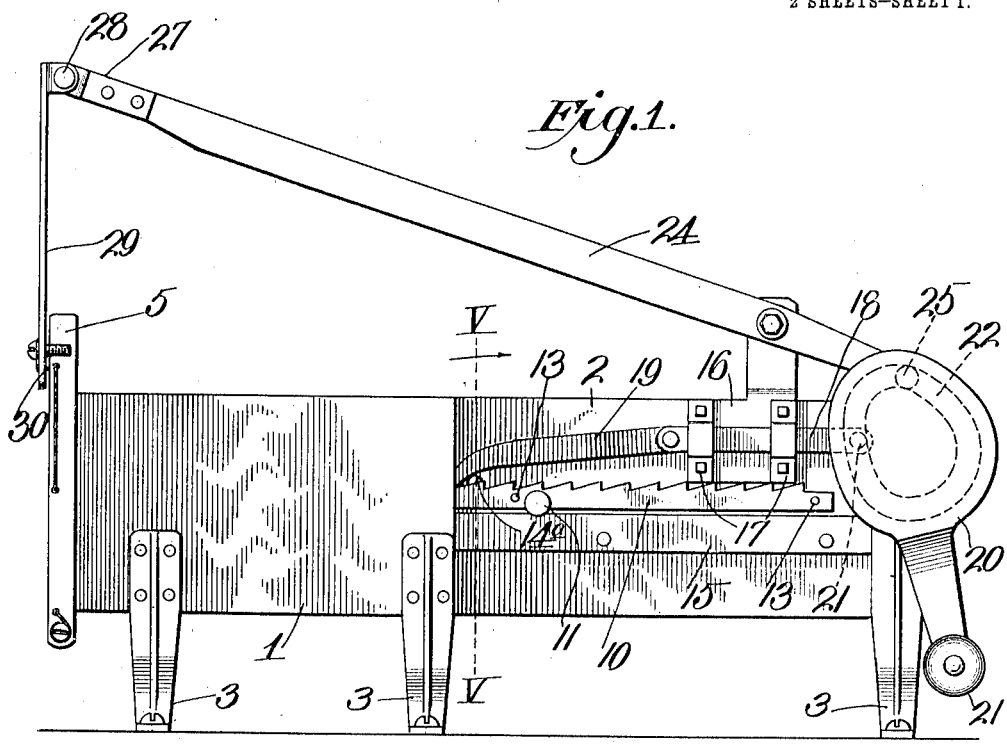
Figure 2:
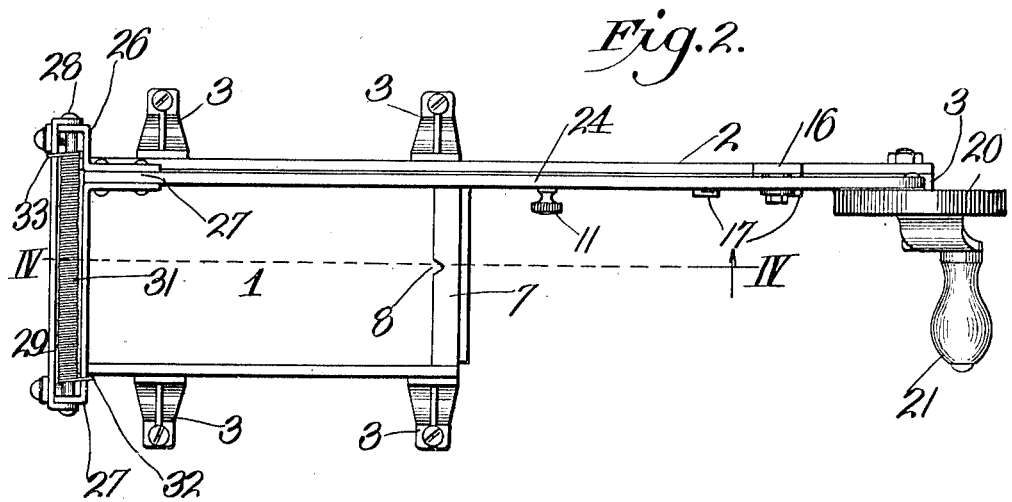

Figure 1, is a side elevation of a butter-pat making machine embodying my invention. Fig. 2, is a top plan view of the same. Fig. 3, is a front view of the same. Fig. 4, is a vertical section on the line IV—IV of Fig. 2, with the presser-plate in its most advanced position. Fig. 5, is an enlarged vertical section on the line V—V of Fig. 1. Fig. 6, is a fragmentary perspective view of the rack-bar of the machine.

In the said drawings, where like reference characters identify corresponding parts, 1 indicates a U-shaped butter holder or receptacle open at each end and having one of its side walls extended rearwardly at 2, and said holder and its extended wall is mounted on legs 3. At its front end the receptacle is bridged by a cross bar 4, and is flanked by a pair of vertical bars 5, which project to a lower plane than the bottom of the receptacle and to a higher plane than said cross bar, and constitute guides for the slicer, as hereinafter explained.

6 are crossed wires extending from side to side of the receptacle and from the bottom thereof to the bridge bar 4, these crossed wires constituting stationary cutters for kerfing the butter preliminary to the operation of the slicer.

7 is a presser plate corresponding in form and adapted to fit snugly in the holder and almost in contact when in its most advanced position with the bridge bar 4, and said plate is provided at its front side with crossed grooves 8 to receive the crossed cutters 6, during the operation of the slicer. The presser plate is secured to the front end of an angle bar 9 fitting against the wall of the holder provided with the extension 2, and said angle bar is provided with a pair of pins 10 and a clamping screw 11.

12 is a rack-bar fitting against bar 9 and provided with holes 13 receiving pins 10, and with a notch 14 in its lower edge, receiving the clamping screw 11. When the clamping screw is removed the rack-bar can be slipped off the pins but cannot become dislodged therefrom while the clamping screw remains in position. The rack-bar is made detachable so that it may be replaced by another one having teeth of different length, in order that the "pats" of butter may be of the desired thickness, as the length of the teeth determines the thickness of the "pats."

When the presser plate is in its most advanced position, as shown in Fig. 4, it can be tilted slightly and then lifted out of the receptacle, as at such time the angle bar 9 is forward of a retaining pin 14$^a$ projecting inwardly from the extension 2. When the presser plate is withdrawn a distance corresponding to the length of a tooth or two, the rear end of the angle bar underlies pin 14$^a$ and at the same time said angle bar, for the purpose of holding the presser plate vertical, rests upon a channeled track bar 15 secured to extension 2, the said extension and the portion of the bar 15 which overlaps the side of the angle bar, guarding against any possibility of movement of the bar 9 whereby its support upon the track would be endangered.

Secured to and at the inner side of the extension 2, and lying wholly above the plane of the rack-bar, is a casting 16, and secured to said casting are caps 17 supporting a longitudinally-movable bar 18, and pivoted to the front end of said bar 18 for movement in a vertical plane, is a pawl 19 resting upon the rack-bar. Journaled at the rear end of the extension 2, and at the upper end of the rear leg 3, is a cam-wheel 20, provided with an operating handle 21 and an oval shaped cam-groove, and said groove receives a small anti-friction roller 21 journaled on the rear end of bar 18, the arrangement being such that in each revolution of the cam wheel, the bar 18 is reciprocated to cause the pawl to advance and withdraw, and in its advance movement, by engagement with a tooth of the rack-bar, advance the presser plate one step, the withdrawal movement of the pawl disposing its front end rearward of the next tooth of the rack-bar. The parts are so proportioned that less than a quarter revolution of the cam wheel causes the presser plate to advance one step. As arranged this step begins shortly after the handle starts forward from a vertically pendent position and terminates as said handle attains a forwardly-projecting horizontal position.

Assuming that the receptacle or holder is proportioned to snugly receive a pound of butter in the form of a block, as customary, and that it is placed in the holder with the presser plate engaging its rear end, and extends from said presser plate to the crossed cutters 6, it will be seen that advance movement of the presser plate causes the block of butter to advance a corresponding distance, and that the said crossed cutters will produce crossed or intersecting kerfs in the butter to a depth corresponding to the length of a tooth of the rack-bar, and that the kerfed portion projects beyond the front end of the holder.

In order to slice the projecting kerfed portion from the block of butter, I provide the following construction: 24 is a rock-lever pivoted to the casting 16, and journaled on the rear end of said lever is a roller 25 engaging the groove 22 of the cam wheel. At its front end the rock-lever is equipped with a pair of angle arms 26 and 27, and pivoted upon a cross-rod 28 carried by said angle arms, is an inverted U-shaped frame 29, the arms of said frame being connected near their lower ends by a cross wire or slicer 30, which bears slidingly against the front edges of the guide bars 5 just forward of the plane of the stationary cutters 6. Mounted on pivot rod 28 is a coiled spring 31 bearing at one extremity at 32 on angle bracket 27 and at the other extremity on the bridge or top bar of the inverted U-shaped frame 29, and holding said frame with its slicer 30 pressing against the guide bars 5. The slicer 30 may be secured in place in any suitable manner, but preferably extends through holes 34 in the arms of frame 29 and is attached to a pair of screws or pins 35, which by preference, stand close to the outer sides of the guide bars 5, to limit lateral movement of the slicer frame in the event that a person handles the machine carelessly, as without guarding against undue lateral movement, the rock lever might be bent or distorted. With each revolution of the cam-wheel the rock-lever depresses and reëlevates the slicing frame 29, the slicer 30 thereof moving vertically because of the guide bars 5, it being also apparent that the frame 29 will have a slight pivotal movement as it moves downward and upward, approaching a position at right angles to the rock-lever as said parts move downward, and assuming a more acute angle to the rock-lever as the latter moves upward. As the parts are proportioned the slicing frame starts downward at about the instant the forward movement of the presser plate ends and completes its downward stroke by the time the cam-wheel makes a quarter revolution and its upward stroke shortly after the cam-wheel completes another quarter revolution, and remains in this elevated position until the cam-wheel completes its said revolution, the presser plate as hereinbefore explained, moving forward on the last quarter revolution of the cam-wheel. In the downward movement of the slicer frame, the slicer 30, cuts vertically through the end of the butter kerfed by the stationary cutter 6, and thus completes the formation of four complete "pats" and separates them from the block of butter and from each other, the said "pats" dropping at the front end of the holder upon a table or into a receptacle placed to receive them.

From the above description it will be apparent that I have produced a butter-pat making machine embodying the features of advantage enumerated as desirable, and I wish it to be understood that I reserve the right to make such changes in the form, proportion, detail construction and organization of the parts as properly fall within the principle of construction defined by the appended claims.

I claim:

1. A butter-pat making machine, comprising a holder, stationary cutters bridging the space inclosed by the front end of the holder, ratchet means one element of which is positively actuated forwardly and backwardly to advance a block of butter in the holder until it projects beyond the front end of the same and is kerfed by said cutters, and a slicer to travel across the front end of the holder and through the kerfed end of the block of butter projecting therefrom.

2. A butter-pat making machine, comprising a holder, a bridge bar at the front end of the holder, stationary cutters bridging the space inclosed by the front end of the holder and the bridge bar, means to force a block of butter forwardly in the holder until it projects beyond the front end of the same and is kerfed by said cutters, a slicer, yielding means holding the same in almost the same plane as the stationary cutters, and means to reciprocate the slicer across the end of the holder.

3. A butter-pat making machine, comprising a holder, stationary cutters bridging the space inclosed by the front end of the holder, a presser plate holding a block of butter in the holder against said stationary cutters, a rack bar for moving said presser plate forward a certain distance to cause the front end of the block of butter to project beyond the end of the holder and said cutters and be kerfed by the latter, a pawl for moving said bar and means for positively actuating said pawl both forwardly and backwardly, and a slicer for reciprocating across the front end of the holder to sever the kerfed portion of the butter from the block thereof.

4. A butter pat making machine, comprising a holder, slicing means at the front end of the holder, a presser plate for feeding a block of butter through the holder to the slicing means, and means acting intermittently to advance the presser plate, said latter means including a bar attached to the presser plate, said bar carrying two pins and a clamping screw projecting horizontally from one face thereof, a rack bar provided with perforations for receiving said pins and a notch to fit the shank of said screw, whereby the rack bar may be removably clamped to said first bar, and reciprocating means engaging the teeth of said rack bar for advancing said presser plate.

5. A butter pat making machine, comprising a holder, slicing means at the front end of the holder, a presser plate for feeding a block of butter through the holder to the slicing means, and means acting intermittently to advance the presser plate, said latter means including a rack bar removably attached to the presser plate, a reciprocating pawl for operating said bar, and cam-controlled means acting to move said pawl positively in both directions of its reciprocation.

6. In a butter pat making machine, a holder, kerfing means and slicing means at the front end of the holder, a ratchet and pawl means for feeding a block of butter through said holder to said kerfing and slicing means, a single-groove cam wheel to the rear of the holder, and means connected with the groove in said wheel for operating both the slicing means and the pawl.

7. A butter pat making machine, comprising a holder, stationary cutters at the front end of the holder, means to force a block of butter through the holder until it is projected from the front end thereof and kerfed by said cutters, a slicer pivoted on the holder, and yielding means to hold the same in substantially the same plane as the stationary cutters, and means to reciprocate the slicer across the front end of the holder.

In testimony whereof I affix my signature, in the presence of two witnesses.

GEORGE W. FURBECK.

Witnesses:
E. L. NIGH,
A. E. ASHTON.

---

Copies of this patent may be obtained for five cents each, by addressing the "Commissioner of Patents, Washington, D. C."